United States Patent [19]

Saunders et al.

[11] Patent Number: 5,255,546
[45] Date of Patent: Oct. 26, 1993

[54] APPARATUS FOR INFLATING INFLATABLE ARTICLES AND SECURING MOBILE ARTICLES TO OTHER OBJECTS

[75] Inventors: Wayne E. Saunders, Sandy; Raymond C. Saunders, Midvale; David W. Saunders, Salt Lake City, all of Utah

[73] Assignee: Striders, Inc., Salt Lake City, Utah

[21] Appl. No.: 590,371

[22] Filed: Sep. 28, 1990

Related U.S. Application Data

[63] Continuation-in-part of Ser. No. 442,136, Nov. 28, 1989, abandoned, which is a continuation-in-part of Ser. No. 377,583, Jul. 10, 1989, abandoned, which is a continuation-in-part of Ser. No. 200,512, May 31, 1988, abandoned.

[51] Int. Cl.$^5$ .............................................. E05B 71/00
[52] U.S. Cl. ........................................ 70/233; 70/30; 70/49
[58] Field of Search ............... 70/233, 234, 49, 30; 24/132 AA, 132 R

[56] References Cited

U.S. PATENT DOCUMENTS

| | | | |
|---|---|---|---|
| 3,788,109 | 1/1974 | Lane | 70/234 |
| 3,910,602 | 10/1975 | Lindner | 70/233 X |
| 3,981,166 | 9/1976 | Madonna | 70/234 |
| 3,990,279 | 11/1976 | Brickel | 70/233 |
| 4,012,930 | 3/1977 | Benson | 70/49 X |
| 4,023,387 | 5/1977 | Gould | 70/233 |
| 4,037,441 | 7/1977 | Ray | 70/49 X |
| 4,086,795 | 5/1978 | Foster et al. | 70/233 |
| 4,126,024 | 11/1978 | Timmons et al. | 70/233 |
| 4,186,576 | 2/1980 | Means et al. | 70/233 |
| 4,188,808 | 2/1980 | Valdez | 70/233 |
| 4,413,382 | 11/1983 | Siegmann | 24/132 R |
| 4,691,539 | 9/1987 | Gover | 70/233 X |
| 4,845,967 | 7/1989 | Evans et al. | 70/233 |
| 4,870,843 | 10/1989 | Lundberg | 70/233 |

FOREIGN PATENT DOCUMENTS

| | | | |
|---|---|---|---|
| 3046810 | 7/1982 | Fed. Rep. of Germany | 70/233 |
| 2529961 | 1/1984 | France | 70/233 |
| 7806670 | 12/1979 | Netherlands | 70/233 |

*Primary Examiner*—Renee S. Luebke
*Assistant Examiner*—Suzanne L. Dino
*Attorney, Agent, or Firm*—Thorpe North & Western

[57] ABSTRACT

An apparatus for inflating inflatable articles, such as bicycle tire inner tubes, and for securing mobile articles, such as bicycles, to other objects. In one preferred embodiment, a first length of cable and a second length of cable are kept within a housing until needed to secure the article to an object. A cable holding sleeve holds the lengths of cable in a substantially side-by-side relationship when the cables are within the housing. When needed, the lengths of cable are withdrawn from the housing, passed through the frame of the article, around the object and the two ends of the cables are locked together by way of, for example, a cylindrical combination lock. When the first and second lengths of cable are unlocked, a constant tension spring, provided in some embodiments, retracts the lengths of cable back into the housing. Other embodiments of the invention are provided with a pump valve at the end of the lengths of cable which remain within the housing. As the cables are moved into and out of the housing, the pump valve acts to force air out of the housing through a pump nozzle located at one end of the opposite end of the housing. The present invention is particularly well suited for application with bicycles and may be applied to a variety of other wheeled vehicles.

59 Claims, 9 Drawing Sheets

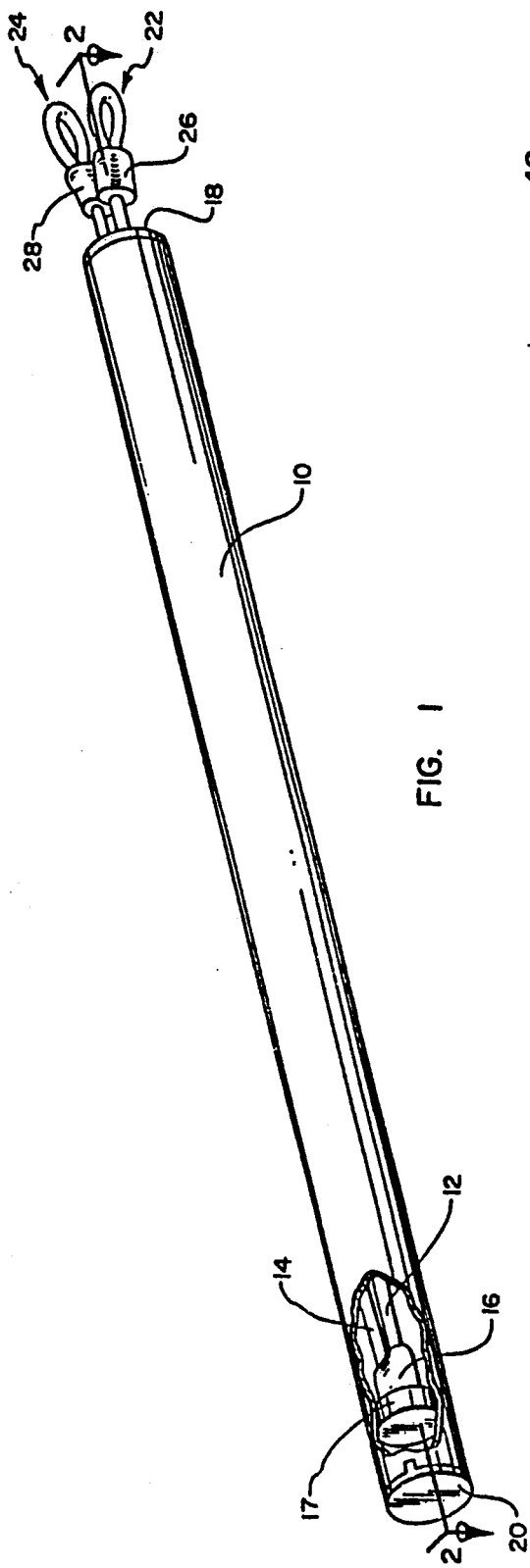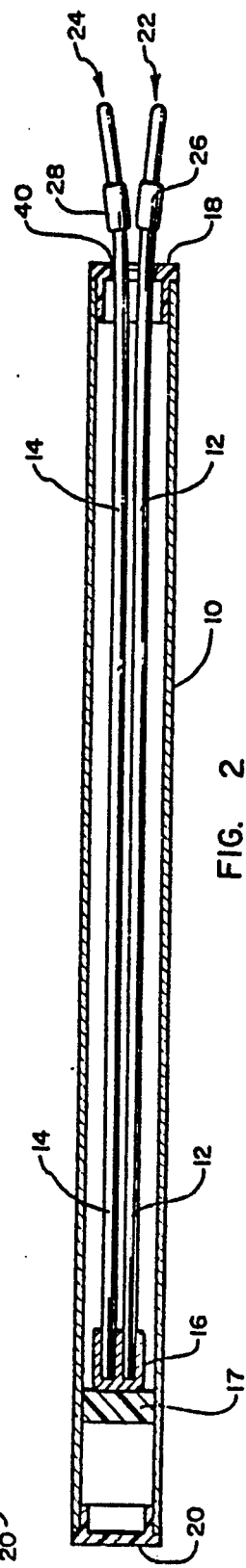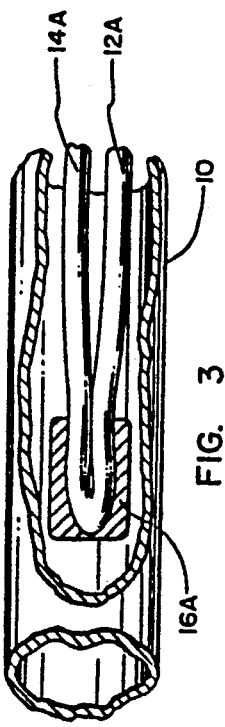

APPARATUS FOR INFLATING INFLATABLE ARTICLES AND SECURING MOBILE ARTICLES TO OTHER OBJECTS

RELATED APPLICATIONS

This application is a continuation-in-part of copending U.S. patent application Ser. No. 07/442,136 filed Nov. 28, 1989 and now abandoned which is a continuation-in-part of U.S. patent application Ser. No. 07/377,583 filed Jul. 10, 1989 and now abandoned which is a continuation-in-part of U.S. patent application Ser. No. 07/200,512 filed May 31, 1988 and now abandoned.

BACKGROUND

1. The Field of the Invention

This invention relates to apparatus used to secure mobile articles such as bicycles to other objects to prevent unauthorized taking thereof and to apparatus used to inflate articles such as bicycle tires and tubes. More particularly, the present invention is related to apparatus which are conveniently mounted on a mobile article, such as a bicycle, which are used to inflate inner tubes and tires and to secure the mobile article to an immobile object.

2. The Prior Art

It has long been recognized that securing systems are necessary to prevent the theft of wheeled articles such as bicycles, lawn mowers, snow blowers, and the like. In particular, an unsecured bicycle is a particularly lightweight, easily moved, and attractive target for a thief. Thus, there has been a long felt need in the art to provide a system for securing bicycles, and other articles which are easily moved, to other objects.

Moreover, bicycle riders particularly need a light weight, compact air pump which can be carried everywhere with the bicycle. Thus, in the past, bicyclists have carried a heavy, bulky securing apparatus and a separate air pump apparatus.

Several types of securing systems are available in the art. For example, some prior art securing systems are intended to merely immobilize one of a bicycle's wheels, with the thought that this will prevent a thief from jumping on the bicycle and riding away. Various types of padlocks have been proposed that will lock the wheel to the bicycle frame for this purpose.

There have also been a number of securing systems proposed for attaching a bicycle or other wheeled article to an immobile or substantially immobile object such as a post, tree, or the like. Flexible chains and cables have been used for this purpose, with the chains or cables being wrapped around the substantially immobile object and then passed through the frame or the wheel of the wheeled article. The ends of the chains or cables are then connected together with some type of locking device so that only an authorized person with the key or combination to the locking device can release the article for use.

One of the major problems encountered in the use of chains or cables for a securing system has been the convenient holding of the chain or cable on the mobile article so that it will be available for use when desired. Simple chains or cables are generally carried around on the article, for example, by wrapping the chain or cable around the bicycle seat post or a portion of the bicycle frame.

While a simple chain or cable wrapped around an article frame member may provide a securing system that travels with a bicycle, it is also very unsightly and cumbersome to use. Such an arrangement is so cumbersome that individuals often forego using such an arrangement, especially when the bicycle or other article will be left unattended for only a short period of time. Thus, the cumbersome nature of the prior art securing systems prevent them from being used effectively.

Wheeled articles, such as those mentioned above, generally include one or more elongated tubular members as frame or handle members. Thus, it has been deemed desirable to provide securing systems which either attach to elongated tubular members and/or are themselves elongated tubular members.

One preferred material for use in securing systems is galvanized steel cable, which in some cases is also referred to as steel rope. Basic steel cable construction makes use of three or more steel strands laid together in a helical arrangement to form a cable. A strand is defined as two or more wires laid together. A strand may consist of seven, nineteen, or more individual wires. A cable may consist of three, seven, or more strands laid together.

Generally, for a given diameter of cable, as the number of wires in the strands and the number of strands in a cable increases, so does the strength, flexibility, and longevity of the cable. Also, and significantly, as the number of wires in a strand and the number of strands in a cable increase, so does the cost of the cable. Thus, as a rule, the least expensive and the least flexible and least durable cable is selected which is suitable for a particular application. Furthermore, in most instances, the cable is also preferably coated with a plastic such as vinyl, nylon, Teflon TM, or some other plastic to protect the galvanized steel from the corrosive effects of the environment and to protect the cable from wear due to abrasion.

When used in securing systems, steel cable combines the important considerations of a flexible securing member with a high strength-to-weight ratio. In securing systems used to secure articles such as bicycles to immobile objects, weight is an important consideration. Still, it is important to use the largest diameter cable allowed by other considerations to increase the securing member's resistance against breakage and cutting.

Moreover, the semi-rigid nature of steel cable makes it much more suitable and manageable for use in securing systems than solid nonflexible members or chain securing members. In securing systems; it is desirable that the securing member cable be somewhat rigid; a somewhat rigid cable being easier for the user to manipulate around poles, fence posts, and other immobile objects. Thus, in addition to the advantage of lower cost, a larger diameter and less flexible cable has the advantage of ease of manipulation by for user. Still further, steel cable, at least of a minimum diameter, requires specialized cable cutting equipment thus providing theft protection against persons who do not possess such cable cutting equipment.

As mentioned, the diameter of a steel cable determines its ability to resist cutting and breakage. The greater the diameter the greater the resistance against cutting and breakage. It is, however, the case that as the diameter of steel cable increases, so does the minimum bending radius of the cable. One major manufacturer of steel cable recommends that the bending radius (as related to pulley diameters) of their most flexible standard steel cable (seven strands of 40 wires each) not be less than 7.5 times the uncoated diameter of the steel cable. Sava Industries, Inc. Catalog, 1989 Thomas Register of American Manufacturers, Catalog File Section at 7783 (1989).

Such a cable, however, is generally too expensive to have application as a securing member in a securing system. More suitable is a cable constructed of seven strands with nineteen wires in each strand. In the case of such a cable a bending radius of at least twelve times the uncoated diameter of the cable is recommended.

Thus, for steel cables having a diameter of one-quarter of an inch (¼ inch), the recommended minimum bending radius is three inches. Moreover, if the minimum bending radius is exceeded, such as forcing a one-quarter inch cable into a one inch radius, the strength and longevity of the cable is compromised. Still further, due to the nature of the cable, as the tightness of the bend imposed on the cable is increased, the force which the cable will exert on its surroundings will increase as it tries to assume a less tight bend. In the extreme case of a zero bending radius, i.e., the cable being bent back on itself, the force necessary to overcome the tendency for the two lengths of cable to spread apart is great.

The advantages of using steel cable have been recognized in the prior art securing devices. For example, U.S. Pat. No. 4,023,387 to Gould discloses an "elongate cable" covered with "weather proof plastic" along its length and U.S. Pat. No. 3,910,602 to Lindner discloses a "braided steel" core covered by a "plastic sheath." Neither the Gould nor the Lindner references, however, recognize the above described considerations which must be accounted for when using steel cable.

Significantly, both the Gould and the Lindner references show the "cables" disclosed therein being bent back upon themselves within the very tight radius of approximately a bicycle frame tube, which is generally not more than about one inch. Thus, very flexible and very small diameter cable must be used in the disclosed devices. If very small diameter cable is not used, the tendency of the cable to straighten itself will cause the devices to be inoperative (i.e., the cable will not retract into the housing or cannot be withdrawn from the housing) as the cable rubs against, and engages, the interior of the housing in which the cable is stored. The use of very small diameter flexible cable which can be easily cut (even by commonly available tools) results in a device which provides virtually no protection from theft.

The prior art securing systems present other difficulties and drawbacks. For example, in U.S. Pat. No. 3,990,279 a drum wound cable is disclosed as a bicycle locking system. Disadvantageously, the structure disclosed therein to retract the cables is such that the cables are retracted at a varying rate due to the nature of the spring device disclosed therein and as the cable drum diameter changes due to the changing amount of cable wrapped therearound. The structure disclosed in U.S. Pat. No. 3,990,279 results in the undesirable result that the tension or pull on the cable is great when the cable is fully withdrawn but the tension dwindles as the cable is retracted into the housing.

Furthermore, the prior art securing systems often made undue noises and rattled when used on a bicycle. Still further, due to the retraction system used, prior art securing systems often did not keep the securing cables within their housing when the wheeled article was in motion. In particular, the normal vibration encountered when riding a bicycle often would cause the securing cables to come either partially or completely out of the housing creating a nuisance for the user.

Moreover, even though bicyclists have needed to carry with them both an air pump and a securing apparatus, the prior art has not provided any significant attempts to effectively combine both securing and air pumping functions in a device which can be carried on a bicycle. For example, French Patent Publication No. 2,529,961 discloses a prior art pump into which a prior art cable lock has been disposed for storage. Even in view of the long period of time that both air pumps and securing devices have carried on bicycles, the prior art has not provided a useable combination lock and air pump. Even in the case of attempts such as disclosed in the cited French patent publication, all of the before mentioned difficulties with prior art securing devices using cables are still present.

In view of the foregoing, it would be an advance in the art to provide a system for securing wheeled articles to other objects that is convenient to use, allows the securing cables to be attractively kept ready to use in a housing, and that still provides for a secure attachment to an immobile object such that the article cannot be stolen. It would be a further advance in the art to provide a system for securing wheeled articles to an immobile object which may be adapted to attach to a number of different wheeled articles or may be incorporated into a tubular frame member of the wheeled article.

It would be a still further advance in the art to provide an apparatus which efficiently provides an apparatus with structures which function both as a lock for mobile articles and provide an air pump for inflating articles such as bicycle tires and tubes. It would be another advance in the art to provide an apparatus for securing wheeled articles to immobile objects wherein the securing cables used therewith are of a substantial diameter so as to deter theft of the wheeled article. It would be yet another advance in the art wherein the securing cables are kept out of the way when not being used and undue noises and rattles are prevented.

It would be still another advance in the art to provide a system for securing wheeled articles which is as small as, and is the shape of, a frame member of the wheeled article and which keeps the securing cables untwisted, tangle-free and ready for immediate use. Still another advance in the art would be to provide an apparatus for both locking a bicycle to another object and for efficiently inflating articles such as bicycle tires.

BRIEF SUMMARY AND OBJECTS OF THE INVENTION

The present invention provides a novel system for securing mobile articles to other objects and for inflating articles. Such articles can include a variety of recreational, household, and commercial articles and the term is particularly intended to include bicycles, bicycle tires and inner tubes, and the like. The present invention advantageously utilizes lengths of flexible cable to secure the article to another object.

In the preferred embodiments of the present invention, two flexible lengths of cable are provided to function as securing cables. The lengths of cable functioning as securing cables may comprise two discrete cable segments or a single cable segment properly formed. Other structures performing similar functions may also be used.

The distal ends of the securing cables extend out of a housing. The housing may be an independent housing specifically adapted for holding the securing cables when not in use or may comprise a hollow frame member of the wheeled article, such as the tube of a bicycle frame. When an independent housing is used, a means for attaching the housing to the frame of the wheeled article is preferably provided.

The proximal ends of the securing cables are retained within the interior of the housing. A cable holding means for holding the lengths of the securing cables in a side-by-side relationship is provided at the proximal ends of the securing cables. Preventing the securing cables from excessively rubbing against the interior of the housing is one primary function of the cable holding means.

If the securing cables comprise two discrete cable segments, the holding means functions to join the two segments together and hold them in a side-by-side relationship. If the securing cables comprise a single continuous cable segment, the holding means functions to keep the two lengths of cable from spreading apart thus maintaining them in a substantially side-by-side relationship.

Some preferred embodiments of the present invention also comprise means for retracting the securing cables into the housing when the article is not secured to an object. The housing and the retracting means cooperate to firmly hold the cables within the housing to prevent undue noises and rattling and to avoid the nuisance to the user of the securing cables leaving the housing when unsecured to an object.

The housing is provided with a guide means to prevent the securing cables from becoming tangled or twisted. A restricting means is also provided to restrict the proximal end of the securing cables from being pulled from the housing. In the preferred embodiments, an end cap fitted at one end of the housing functions as a guide means. The end cap, in cooperation with a cable holding sleeve, functions as a restricting means.

Locking means is also provided at the distal ends of the securing cables to allow the distal ends to be locked to another object, preferably each other, and around an object. Thus, the securing cables secure the article to an object when encircling the object and a portion of the article frame.

In the preferred embodiments of the present invention which include structures functioning as an air pump, the lengths of cable, or cable means, are connected to a pump valve assembly, or pump valve means, which forms a slidable fluid-tight seal with the inner wall of the housing. As the user slides the cables in and out of the housing in a reciprocating motion, the pump valve assembly forces the air within the housing out through an opening at one end of the housing. A nozzle means is provided to channel the air forced out of the housing into an inflatable article connected thereto.

In view of the foregoing, it is a primary object of the present invention to provide a system for securing mobile articles to other objects that is convenient to use, allows the securing cables to be attractively kept in a housing, and that still provides for a secure attachment to an object such that the article cannot be stolen.

It is also a primary object of the present invention to provide a compact and efficient apparatus for both securing mobile articles to other objects and to inflate inflatable articles such as bicycle tires.

It is another object of the present invention to provide an apparatus which provides both air pumping and locking functions which is as compact as an apparatus which provides only one of these functions.

It is another object of the present invention to provide an apparatus which is light weight, compact, and particularly suited for providing both a lock and an air pump which can be carried on a bicycle.

It is another object of the present invention to provide a system for securing mobile articles to other objects that is easy to attach to an article.

It is still another object of the present invention to provide a system for securing articles to other objects which may be incorporated into a tubular frame member of a wheeled article.

It is another object of the present invention to provide a system for securing a bicycle to immobile objects which is easy to use with, and install on, a bicycle.

It is another object of the present invention to provide a system for securing mobile articles to other objects incorporating securing cables and wherein the cables are retracted into a housing at a constant force when not in use.

It is a still further object of the present invention to provide a system for securing mobile articles to other objects wherein the securing cables are of a sufficiently large diameter to deter theft of the mobile article.

It is yet another object of the present invention to provide a system for securing mobile articles to other objects wherein a single embodiment of the system may be adapted for use on many different mobile articles.

It is another object of the present invention to provide a system for securing mobile articles to other objects which is no larger than approximately the frame member of the mobile article.

It is another object of the present invention to provide a system for securing mobile articles to other objects wherein securing cables are kept untwisted, tangle-free, and ready for use.

It is another object of the present invention to provide a system for securing mobile articles to other objects which conveniently and firmly keeps the securing cables out of the way when not in use and avoids undue noises due to rattling of the cables and associated apparatus.

It is another object of the present invention to provide a system for securing mobile articles to other objects which prevents placing undue strains on the securing cables while they are not in use.

These and other objects and advantages of the present invention will be understood by examining the disclosure of the presently preferred embodiments of the invention contained herein and by practicing the present invention.

BRIEF DESCRIPTION OF THE DRAWINGS

FIG. 1 is a perspective view, partially cut away, of a first preferred embodiment of the present invention;

FIG. 2 is a longitudinal cross-section taken along line 2—2 of FIG. 1;

FIG. 3 is an elevated view, partially cut away, of a portion of an alternative cable holding structure which may be incorporated into embodiments of the present invention;

DETAILED DESCRIPTION OF THE PREFERRED EMBODIMENTS

Figure 4:
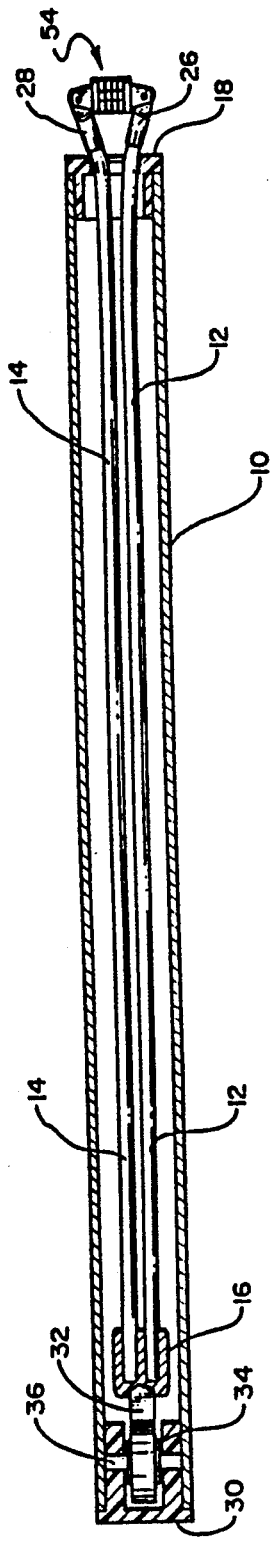
FIG. 4 is a longitudinal cross-section of a second presently preferred embodiment of the present invention.

Reference will now be made to the drawings wherein like structures will be provided with like reference designations.

FIG. 1 provides a perspective view of a first presently preferred embodiment of the present invention. It will be appreciated that the first embodiment illustrated in FIG. 1 is a self-contained system for securing articles to other, preferably immobile, objects. While the embodiments disclosed herein may be attached to a variety of articles, the first presently preferred embodiment is particularly adapted to be attached to wheeled articles, namely, bicycles.

The first embodiment illustrated in FIG. 1 includes an elongated, hollow tubular housing 10, a first length of cable 12, a second length of cable 14, the first and second lengths of cable functioning as securing cables, and a cable holding sleeve 16. A first end cap 18 is provided at a first end of tubular housing 10 and a second end cap 20 is provided at a second end of tubular housing 10.

A plunger 17 is attached to cable holding sleeve 16. Plunger 17 functions to keep the securing cables and cable holding sleeve from rattling in the housing and to slightly engage the interior wall of housing 10 so as to have some frictional engagement with the same. The plunger's frictional engagement of the interior of the housing assists with keeping the securing cables from moving too freely within the housing. Both first length of cable 12 and second length of cable 14 are provided with a locking loop, generally designated 22 and 24, respectively, formed by bending the distal ends of cables 12 and 14 and swaging or crimping sleeves 26 and 28 into place.

In accordance with the present invention, housing 10 illustrated in FIG. 1 is just one example of a housing means which may be incorporated into the present invention. In the first embodiment represented in FIG. 1, housing 10 is preferably cylindrical aluminum tube. It will be appreciated that many other structures could be used as the housing means of the present invention. For example, a housing fabricated from different materials or of a different size, shape, or configuration could be used.

Any structure which performs the function of at least partially enclosing securing cables 12 and 14 and keeping securing cables 12 and 14 in a substantially linear fashion when they are not being used is to be considered equivalent to housing 10 represented in the drawings. Furthermore, as will be explained more fully later in this disclosure, the present invention may be incorporated into a frame member of the article to be secured thus allowing the frame member itself to be used as the housing means of the present invention.

The first embodiment is intended to be used primarily to secure bicycles to immobile objects. Since the first embodiment is intended to be used with bicycles, keeping the weight of the embodiment as low as possible is important. Thus, aluminum is the presently preferred material for housing 10. Nevertheless, it is still critical to make the embodiment resistant against theft.

In the case of embodiments of the present invention which are to be used to secure bicycles to objects, it is preferred that the shape of the housing simulate the shape of the bicycle frame member, i.e., generally cylindrical, and that the diameter of the housing not exceed the diameter of the bicycle frame member to which it is attached.

A common bicycle frame member diameter is approximately one inch. Thus, it is preferred that housing 10 have an inner diameter of 0.810 inches and an outer diameter of less than one inch. Other cross-sectional dimensions for the tubular housing may also be used according to the present invention, including, for example, 1.5 inches, 1.0 inches, and 0.75 inches.

It will be appreciated that the elongated tubular shape of housing 10 provides significant advantages. Among these advantages is that the securing cables are stored linearly and are not coiled around a drum or required to be bent along their length. Since steel cable will somewhat retain the shape which is imposed upon it during storage, keeping securing cables 12 and 14 stored linearly prevents undesirable bends and patterns from being impressed into the securing cables.

Still further, the cylindrical shape of housing 10 is aesthetically pleasing when attached to a bicycle frame member and simulates the shape of air pumps commonly attached to bicycle frame members. Moreover, the small diameter and cylindrical shape of housing 10 minimize wind resistance of the housing, particularly when attached to the "downwind" side of the bicycle frame member.

Referring next to FIG. 2, which is a cross-sectional view of the first embodiment taken along line 2—2 in FIG. 1, the arrangement of securing cables 12 and 14 within housing 10 can be observed. FIGS. 1 and 2 represent cable lengths 12 and 14 in their retracted position.

To secure an article using the embodiment illustrated in FIG. 1, a user withdraws the securing cables from the housing and passes the cables through the frame of the article to be secured and locks locking loops 22 and 24 together using any commonly available locking device.

When not in use, the securing cables are inserted into housing 10 by the user. The limited diameter of housing 10 keeps the inner wall of the housing in close contact with the cables held therein and so reduces any vibration and rattle of cables 12 and 14 within the housing.

Securing cables 12 and 14 are exemplary of the cable means of the present invention. One example of a cable means in accordance with the present invention are the two discrete cable segments joined together as illustrated in FIG. 2. Another example of a cable means in accordance with the present invention is the continuous cable segment which is bent back upon itself as represented in FIG. 3. As used herein, the term "securing cables" is intended to include both the arrangement represented in FIG. 2 and the arrangement represented in FIG. 3 and equivalents thereof. For example, a series of solid segments connected together by joints so that it approximates the flexibility of a length of steel rope is to be considered within the scope of the cable means.

Also included in the present invention is a cable holding means whose function it is to hold the two securing cables in a substantially parallel relationship. As mentioned earlier, steel cable which is bent back upon itself 180° requires that a structure be used to hold the securing cables in a substantially side-by-side relationship. As can be seen in FIG. 2, if securing cables 12 and 14 are not held together, securing cables 12 and 14 will unduly rub against the inner wall of housing 10 and interfere with the operation of the system.

To keep the securing cables in a substantially side-by-side relationship, a cable holding sleeve, such as 16 in FIG. 2 and 16A in FIG. 3, is included to function as cable holding means. With the inclusion of a cable holding sleeve, or its equivalent, either the two discrete cable segments represented in FIG. 2 of the single continuous cable segment represented in FIG. 3, may function as the cable means of the present invention.

The structure illustrated in FIG. 3, including securing cables 12A and 14A extending out of the cable holding sleeve 16A and structures equivalent thereto, are intended to be included within the scope of the present invention. Preferably, cable holding sleeve 16A is a crimped or swaged metallic sleeve. Other structures, however, may be used within the scope of the present invention.

Figure 5:
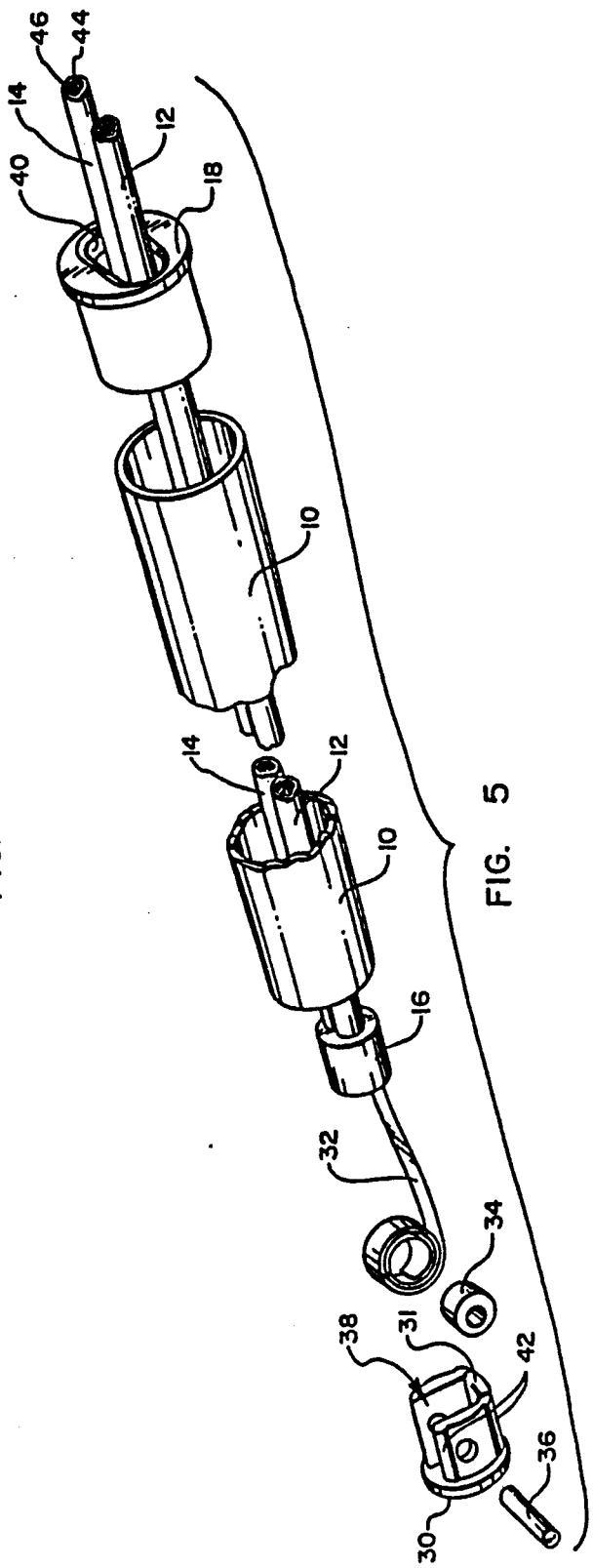
FIG. 5 is an exploded, partially cut away perspective view of the second presently preferred embodiment illustrated in FIG. 4.

It is preferred that securing cables 12, 12A, 14, and 14A, as well as the other cable disclosed herein, comprise steel cable. As explained earlier, steel cable, properly selected, provides the proper resistance to cutting and breaking and the proper rigidity. Selecting cable having the proper resistance to cutting and proper rigidity provides that the apparatus of the present invention will be a significant deterrent to theft of an article while at the same time providing other important advantages as explained herein. In the preferred embodiments disclosed herein, as shown in FIG. 5, the preferred steel cable consist of a steel core 44 surrounded by a plastic coating 46.

The preferred cable for use in the described embodiments is manufactured by Sava Industries, Inc. of Riverdale, N.J. and identified by part number 3219-GV-9. This preferred cable is a galvanized steel cable wherein each cable consists of seven strands of nineteen wires and having a nominal uncoated diameter of 7/32 of an inch and a coated diameter of 9/32 of an inch. The minimum breaking strength of the preferred cable is 5,600 pounds while weighing approximately 1.5 ounces per foot of cable. This cable has the characteristics of rigidity, weight, and strength which make the cable well suited for use in the embodiments of the present invention. Other cables and diameters of cables, for example one-eighth, one-quarter, and three-eights diameter cables may be used in accordance with the present invention.

It will be appreciated that materials other than the specified steel cable may be used. For example, rather than steel, the cable may consist of fibers or wires of another material, metallic or otherwise. Thus, as used herein, the term "cable" is intended to include within its meaning, without limitation, any flexible rope-like structure comprised of a plurality of individual fibers, wires, or filaments.

Also represented in FIG. 2 are two end caps. A first end cap 18 is provided at a first end of housing 10. A second end cap 20 fits into a second end of housing 10 and prevents entry of dirt and contaminants therein.

In the first embodiment illustrated in FIG. 2, the first end cap 18 functions as a restricting means for restricting the complete removal of securing cables 12 and 14 from housing 10. In the embodiment illustrated in FIG. 2, cable holding sleeve 16 cooperates with end cap 18 to restrict the complete removal of the securing cables from the housing. Other structures, however, may function as the restricting means of the present invention.

First end cap 18 is provided with an oval bore 40 (best seen in the perspective view of FIG. 5) through which the securing cables pass and which serves as a guide for the cables as they are withdrawn from, and retracted into, housing 10. The oval shape of bore 40 helps prevent the securing cables from becoming twisted or tangled. It will be appreciated that other structures may serve within the scope of the present invention to guide the cables.

The first end cap 18 also functions to keep the first and second lengths of cable maintained in a substantially side-by-side relationship and in a linear configuration immediately after the cable exits the housing. As will be appreciated from the forgoing discussion, it is important that the cables not be required to undergo a significant bend immediately upon leaving the tubular housing. Requiring the cables to undergo such a bend can interfere with the smooth operation of the device and can weaken the cables and decrease their longevity.

The structure of the first embodiment illustrated in FIGS. 1 and 2 can be attached to any number of articles having a frame, such as a bicycle. Once the embodiment is attached to the article, the securing cables remain in the housing until needed whereupon they are withdrawn by the user, passed through the frame of the article and around an immobile object, and locked together. In the described fashion, the embodiments of the present invention are conveniently attached to an article and remain ready for use.

Reference will now be made to FIGS. 4 and 5 wherein is illustrated a second preferred embodiment of the present invention. A shown in FIGS. 4 and 5, the second embodiment includes housing 10, securing cables 12 and 14 held in a side-by-side relationship by cable holding sleeve 16, first end cap 18, and cylinder lock 54. Also provided in the second illustrated embodiment are structures which function as a retraction means for retracting the securing cables into the housing for storage. While it is not always necessary to include structures functioning as a retraction means in the embodiments of the present invention, in some cases it is desirable to do so.

The retraction means of the present invention retracts and/or holds the securing cables in the housing when they are not being used to secure the article. For example, when the embodiments of the present invention are attached to a bicycle or other article which is subject to vibration the retraction means helps to prevent the securing cables from moving out of the housing. Thus, the retraction means of the present invention may include any structure which functions to keep the securing cables in the housing when unused.

Moreover, the retraction means preferably, but not necessarily, applies a constant retracting tension to the securing cables so that the cables are constantly being pulled tight when stored. Thus, the movement of the securing cables within the housing is reduced and any noises or rattles which might be caused by the structures contained within the housing hitting the inner wall of the housing are minimized or eliminated. Furthermore, having the retraction means apply a constant retraction bias to the securing cables ensures that the unneeded portion of cable remains in the housing when a user is preparing to secure the article to an object.

In the second embodiment illustrated in FIGS. 4 and 5, a constant tension spring 32, a spring bushing 34, an axle 36, and a spring holder 30 cooperate to function as the retraction means. As shown in the cross-sectional view of FIG. 4, a first end of constant tension spring 32 is connected to cable holding sleeve 16. In the preferred embodiment represented in FIGS. 4 and 5, a first end of constant tension spring 32 is connected to cable holding sleeve 16 by the action of the swage or crimp formed in sleeve 16.

As can be seen best in the exploded perspective view of FIG. 5, constant tension spring 32 is formed so that it coils itself around bushing 34. Importantly, the proper operation of constant tension spring 32 requires that the second end of constant tension spring 32 be coiled around bushing 34 but be allowed to rotate freely about bushing 34. Moreover, the length of constant tension spring 32 must be adequate so that the spring remains partially coiled around bushing 34 even when securing cables 12 and 14 are withdrawn from the housing as far as allowed by the structures of the restraining means.

Bushing 34 is held in place by axle 36 which is inserted through bores provided in the bushing 34 and a spring holder 30. The coiled portion of constant tension spring 32 is held in place and guided onto the bushing during the winding and unwinding of the spring by a recess 38 formed in spring holder 30.

Spring holder 30 is provided with four ridges 42 (only two of which are visible in FIG. 5) which serve to prevent any adhesive applied to the spring holder during assembly of the embodiment from seeping into recess 38 and interfering with the operation of the constant tension coiled spring. The preferred method of fixing the spring holder 30, the end cap 20, and the end cap 18 into housing 10 is by way of an adhesive.

It is preferred that spring holder 30, axle 36, bushing 34, and end cap 18 all be fabricated from a polycarbonate material. It will be appreciated that other suitable materials could also be used. A wear plate 31 is positioned on spring holder 30 to retard wear of the spring holder material due to the scraping of the constant tension spring during operation.

The constant tension spring represented in FIGS. 4 and 5 differs from spring components utilized in prior art securing systems in both structure and function. As can be seen in FIG. 5, the coiled end of the constant tension spring is not attached to bushing 34 as would be the case in prior art devices.

Furthermore, the construction of the constant tension spring is such that the tension, or "pull," of the spring varies little, if any, throughout most of the "travel" of the spring. Thus, in contrast to springs used in the prior art devices which exert their greatest tension or pull when nearly fully extended, i.e., when the cables are fully withdrawn, and very little tension when the spring is nearly fully coiled, the constant tension spring incorporated into the present invention provides a substantially constant tension or pull regardless of the coiled state of the spring itself.

The constant tension spring preferably utilized in the embodiments of the present invention has the further advantage of providing a greater tension than the same size springs used in the prior art devices. The incorporation of a constant tension spring into the embodiments of the present invention provides a securing system which is trouble-free and easy to use. Nevertheless, other types of spring devices may also be utilized in some embodiments of the present invention.

The constant tension spring which is preferred for use in the illustrated embodiments is one manufactured by John Evans Sons, Inc. referred to as 0.008×0.25×20 inches which is fabricated from 301 high yield stainless steel having a #5 edge and a minimum tensile strength of 270,000 p.s.i. As will be appreciated by those skilled in the fabrication of such constant tension springs, the tension or the pull exerted by the spring is dependent upon factors such as the thickness and width of the spring material and the inside diameter of the spring when it is coiled. Those skilled in the art of designing and fabricating such springs can select or design other springs suitable for use in the other embodiments of the present invention.

The incorporation of a constant tension spring into the embodiments of the present invention prevents the securing cables from being uncontrollably pulled back into the housing as is experienced with prior art devices. Moreover, the structure of end cap 18 arrests the movement of the securing cables without any damage to itself and while protecting the housing.

Figure 6:
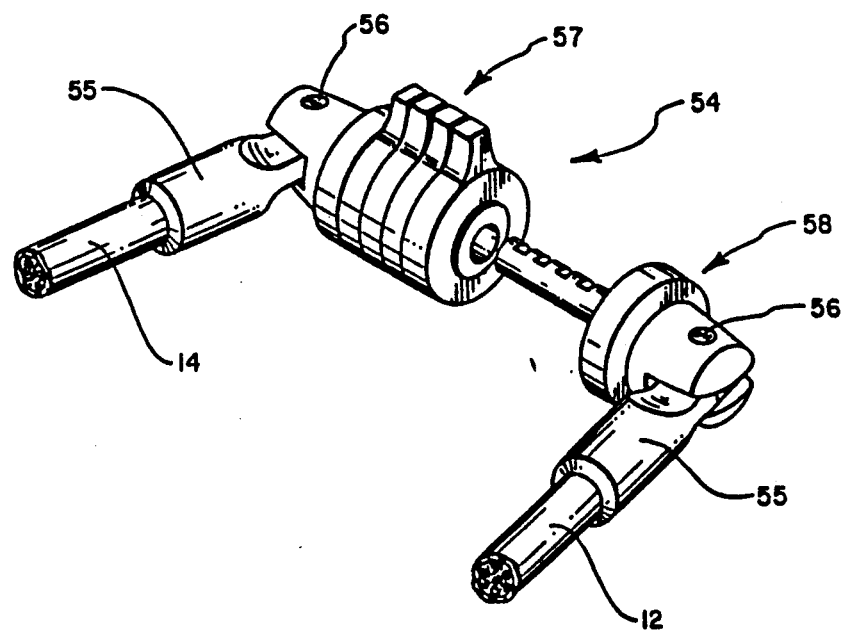
FIG. 6 is a perspective view of the locking structure illustrated in FIG. 4.

Referring next to FIG. 6, a more detailed perspective view of cylinder combination lock 5 is provided. Cylinder combination lock 54 includes a cylinder body, generally designated at 57, and a shaft, generally designated at 58. Cylinder body 57 and shaft 58 are hingeably attached to fittings 55 by pins 56. Fittings 55 are preferably swaged or crimped in place at the end of the securing cables. As is known by those skilled in the art, the illustrated combination lock is used by inserting shaft 58 into cylinder body 57 and operating the lock to hold the shaft therein.

Figure 7:
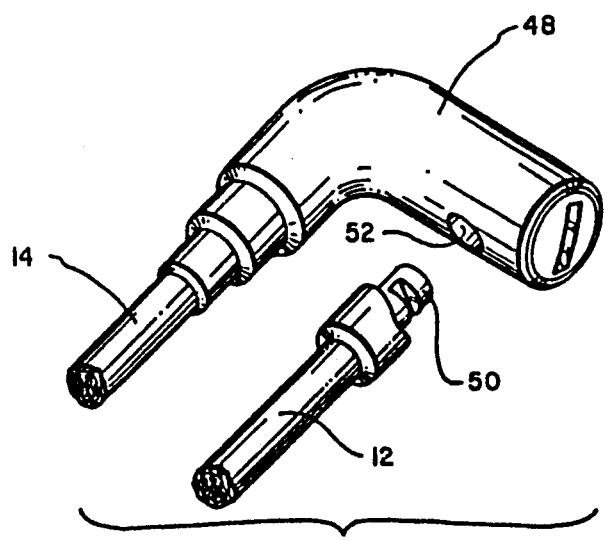
FIG. 7 is a perspective view of another locking structure which may be included in some embodiments of the present invention.

Referring next to FIG. 7, another lock which may serve as the locking means of the present invention is shown. In the lock represented in FIG. 7, a post 50 is inserted into a receptacle 52 provided in a lock body 48. Post 50 is secured in lock body 48 by use of a key (not shown) to operate the locking mechanism. It will be appreciated that the illustrated structures are merely exemplary of the many structures which could be incorporated into the present invention to serve as a locking means.

Figure 8:
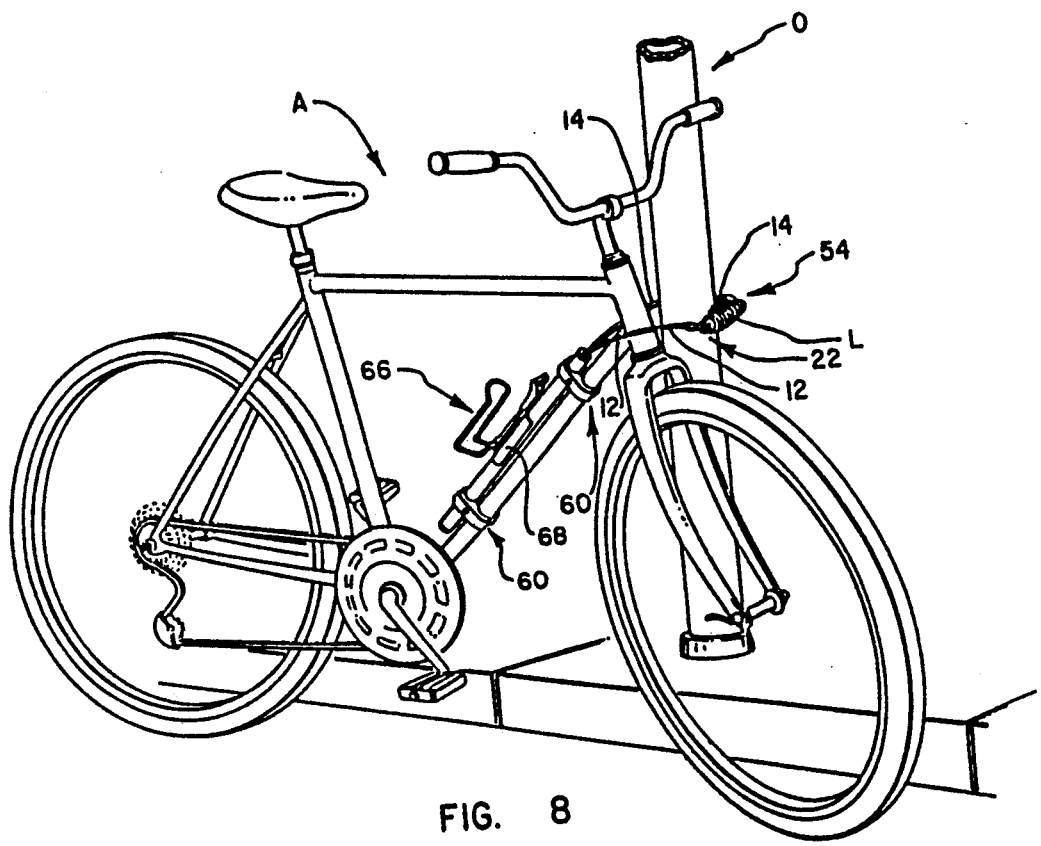
FIG. 8 is a perspective view of a bicycle with an embodiment of the present invention attached thereto showing one application of the embodiments of the present invention.

FIG. 8 will now be referred to in order to show an embodiment of the present invention applied in one of a number of contemplated uses of the present invention. Represented in FIG. 8 is a wheeled article, generally designated A, namely a bicycle, which is secured to an immobile object, generally designated O, namely a post as is commonly found curbside in urban areas. The illustrated embodiment of the present invention is attached to the down tube, or other tube, of the bicycle by way of two clamps indicated at 60.

A bottle cage 66 is also fixed to the housing of the embodiment by way of a clip 68 which flexibly grips the exterior of the housing. The lateral cross-sectional shape of clip 68 is preferably greater than a half-circle having a diameter equal to the outer diameter of the housing. Since it is preferred that the inner surface of the housing be free from protrusions, an adhesive is used to permanently attach clip 68 to housing 10.

The embodiment illustrated in FIG. 8 is provided with combination lock 54, illustrated in greater detail in FIG. 6, which functions as the locking means of the illustrated embodiment. By examining FIG. 8, it will be appreciated that the present embodiment is particularly suited for securing bicycles to objects.

Figure 9:
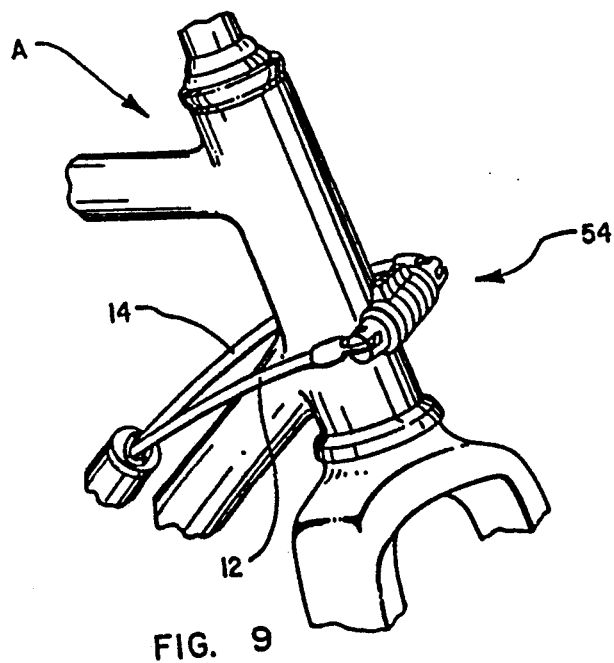
FIG. 9 is an enlarged perspective view of a portion of the article and the embodiment of the present invention illustrated in FIG. 8.

FIG. 9 provides an enlarged perspective view of a portion of bicycle A and combination lock 54 illustrated in FIG. 8. As shown in FIG. 9, when not being used to secure the bicycle to an object, combination lock 54 may be located in a read-to-use position with cables 12 and 14 disposed on either side of the bicycle head tube and combination lock 54 joined in front of the head tube.

The arrangement of the embodiment illustrated in FIG. 9 is particularly advantageous. With the securing cables located on either side of the bicycle head tube, and the securing cables locked together, the embodiment is both secured to the bicycle frame and ready for immediate use.

Furthermore, other embodiments of the present invention may also be attached to a bicycle frame and kept ready to be used at all times with little effort from the user. Thus, the system of the present invention will be used regularly, rather than being ignored as is the case with prior art devices which are too cumbersome or complicated to allow easy use.

It will be appreciated that different securing cables may be used to accommodate different applications and that in a application such as that illustrated in FIGS. 8 and 9, additional components, such as components to hold combination lock 54 in place adjacent to the head tube, may be added to the described structures to further facilitate use of the embodiment.

Figure 10:
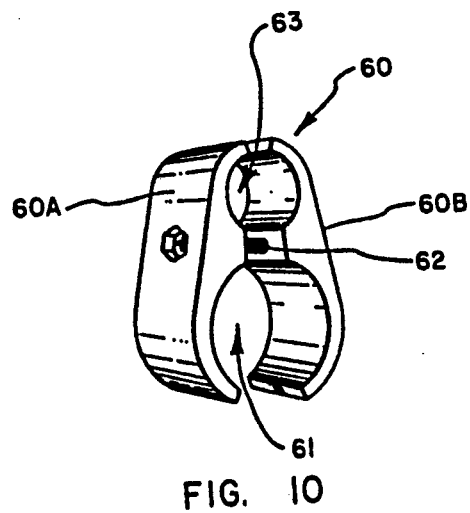
FIG. 10 is a perspective view of a clamp constructed in accordance with the present invention.
Figure 11:
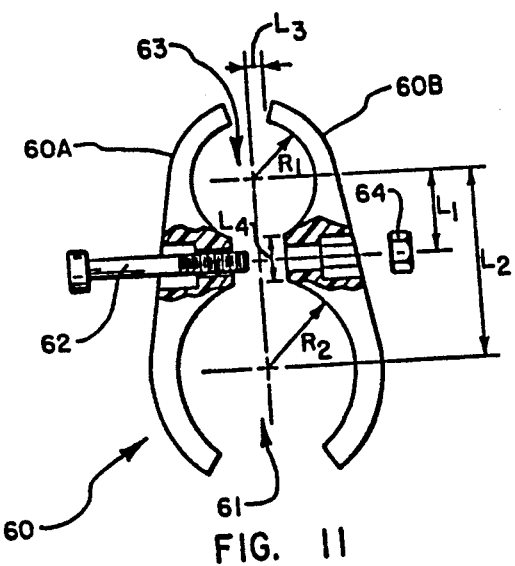
FIG. 11 is a side view, partially cut away, of the clamp illustrated in FIG. 10.

FIGS. 10 and 11, which are perspective and cross-sectional views, respectively, of clamps 60 which are represented generally in FIG. 8, will be referred to next. Clamp 60 comprises two identical clamp halves 60A and 60B which are held together by bolt 62 and nut 64. Clamp 60 is able to accommodate a range of bicycle frame tubes in the first jaw, generally designated 61, with the second jaw, generally designated 63, being adapted to accommodate the fixed diameter of the housing of the embodiment. Since the diameter of bicycle frame tubes varies from one bicycle to the next, there is a great advantage to having a clamp structure which can accommodate a range of bicycle frame tube sizes.

Provided below in Tables A and B are the dimensions which are presently preferred for a larger clamp and a smaller clamp, respectively, which can accommodate two different ranges of bicycle frame tube sizes.

TABLE A

| Dimension | Value |
|---|---|
| $R_1$ | 0.438 inches |
| $R_2$ | 0.594 inches |
| $L_1$ | 0.625 inches |
| $L_2$ | 1.407 inches |
| $L_3$ | 0.0125 inches |
| $L_4$ | 0.448 inches |

TABLE B

| Dimension | Value |
|---|---|
| $R_1$ | 0.438 inches |
| $R_2$ | 1.0 inches |
| $L_1$ | 0.625 inches |
| $L_2$ | 1.827 inches |
| $L_3$ | 0.0125 inches |
| $L_4$ | 0.443 inches |

Figure 12:
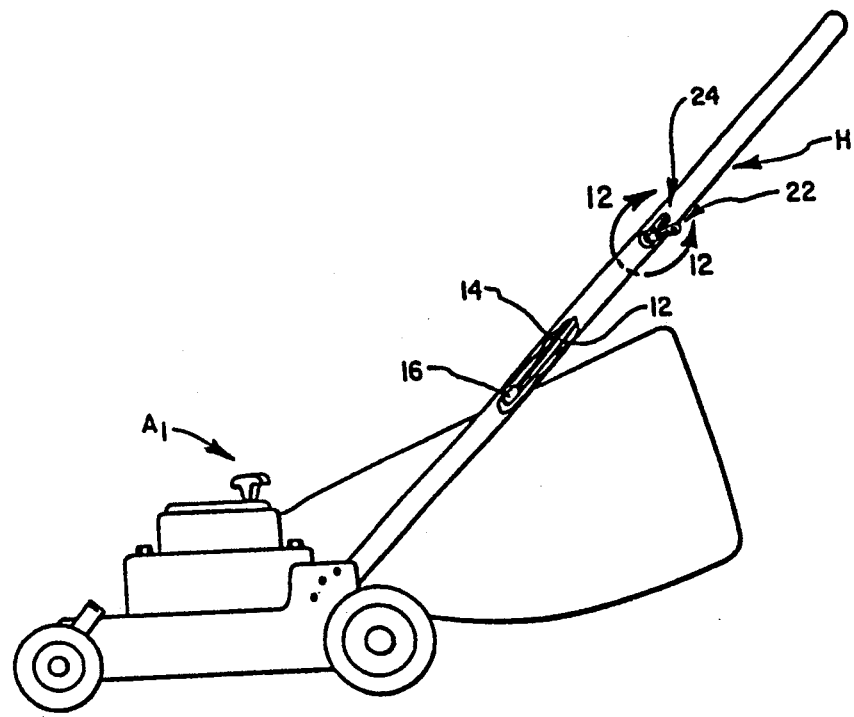
FIG. 12 is a partially cut-away perspective view of a presently preferred embodiment of the present invention installed on another wheeled article.
Figure 13:
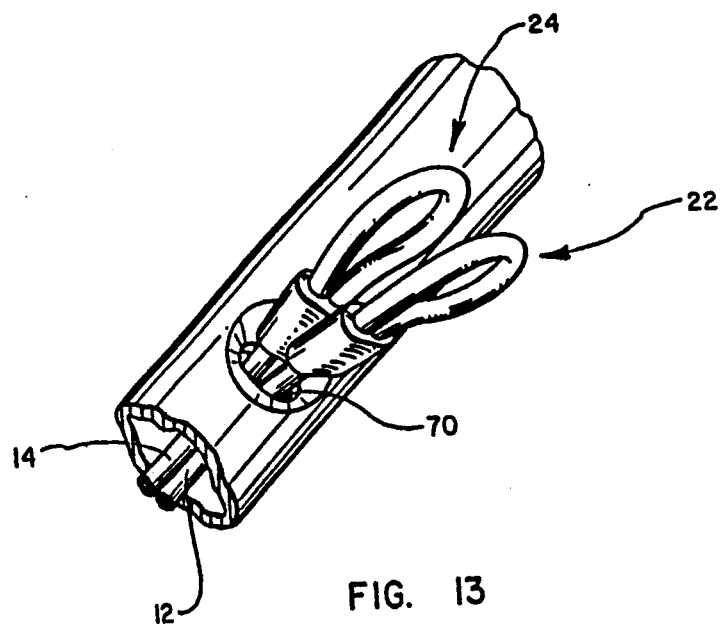
FIG. 13 is an enlarged perspective view of a portion of the embodiment illustrated in FIG. 12.

Referring next to FIG. 12, another article, generally designated $A_1$, namely a power lawn mower, has been provided with an embodiment of the present invention. As indicated earlier, the present invention may be adapted for use with a variety of articles having wheels, i.e.. wheeled articles. Such articles are commonly targets of thieves due to the ease with which they may be moved. Such articles also commonly include tubular frame members.

In FIG. 12, an embodiment of the present invention is shown wherein a handle H of the lawn mower $A_1$ is utilized as the housing of the embodiment. Securing cables 12 and 14 are stored within handle H and are kept in proper side-by-side alignment by cable holding sleeve 16 as has been explained in connection with the earlier described embodiments. Lock loops 22 and 24 formed at the end of cables 12 and 14, respectively, protrude out from an oval opening 70 provided in handle H. When the article is to be secured to an object, the securing cables are withdrawn from their storage position and passed through the frame of the article, around an object, and the locking loops are locked together.

Figures 14, 15:
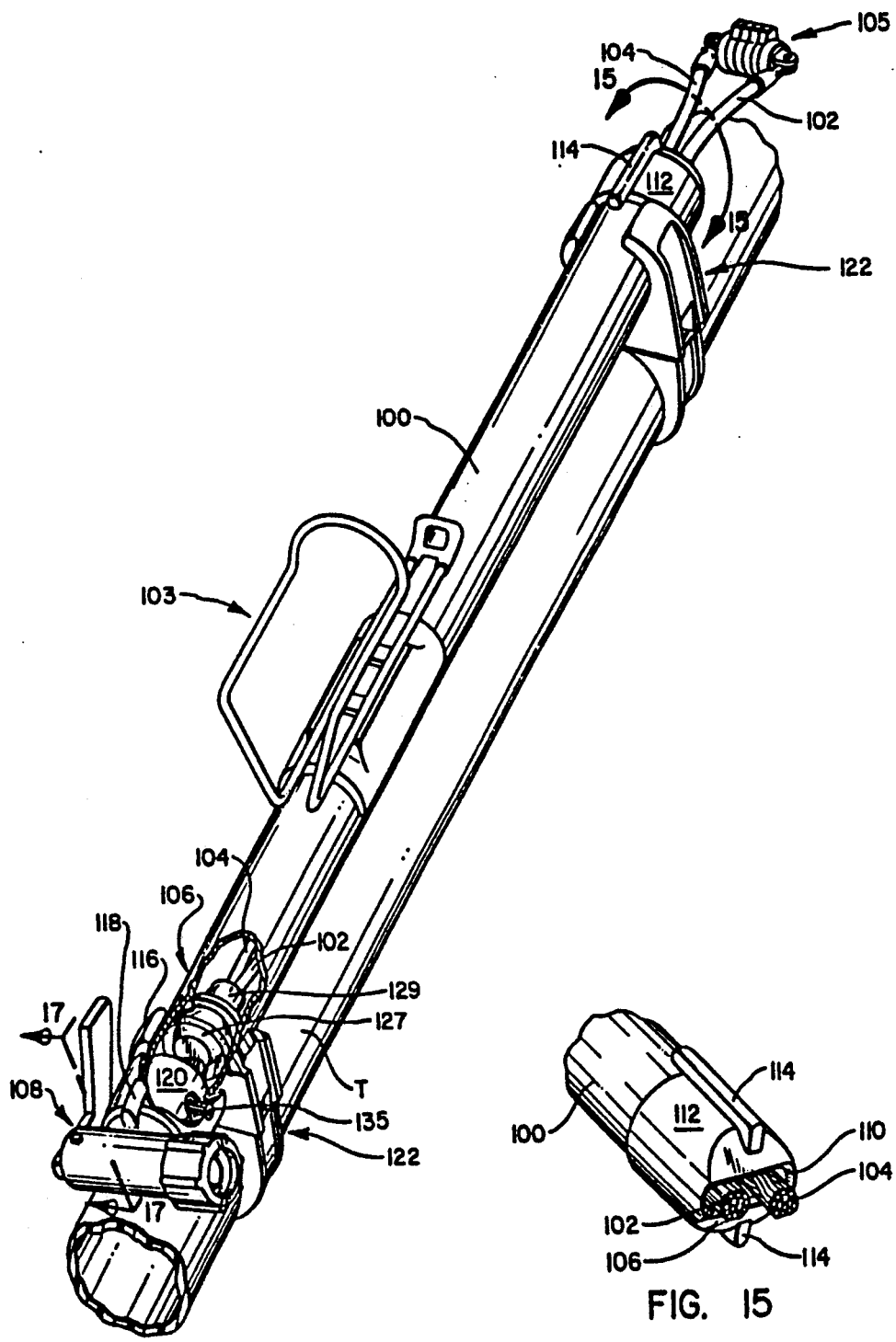
FIG. 14 is a perspective view, partially cut away, of a presently preferred embodiment of the present invention including both locking and air pumping structures.
FIG. 15 is a reverse perspective view of a portion of the embodiment illustrated in FIG. 14 and taken along line 15—15 of FIG. 14.

Referring next to FIG. 14, another presently preferred embodiment of the invention including both locking structures and air pumping structures is represented. The embodiment of the invention illustrated in FIGS. 14–17 has the great advantage of providing both a novel locking structure and air pump structure in a convenient and efficient to use configuration that takes no more space than previously available air pumps commonly used on bicycles.

Provided in FIG. 14 is a partially cut away perspective view of the embodiment of the present invention having both locking structures and air pumping structures. As with the earlier described embodiments of the present invention, the embodiment represented in FIGS. 14–17 includes a preferably cylindrical tubular housing 100. The illustrated tubular housing 100 is another example of a housing means for providing an enclosure. It will be appreciated that many other structures performing functions which are similar or equivalent to those performed by the tubular housings represented in the drawings can also function as the housing means of the present invention.

Disposed within the tubular housing 100 are two cables 102 and 104 which are preferably selected in accordance with the earlier provided considerations. In the case of the embodiments of the present invention which combine both locking and air pumping structures, choosing a cable, or cable means, having the proper longitudinal stiffness is important since the cables 102 and 104 will function as a pump handle for the user.

Desirably, as the diameter of the cables 102 and 104 increases, so does their longitudinal stiffness and their ability to resist cutting by a thief. Thus, the embodiment of the present invention represented in FIGS. 14-17 makes use of cables 102 and 104 which are relatively "stiff" which is in further contrast to the previously available devices which must use cables capable of freely bending around a tight radius as they are used to lock a bicycle or other article to another object.

It will be appreciated that the cable means of the present invention can include structures other than the represented cables 102 and 104. For example, structures such as a single or double length of short solid segments, each short segment connected to an adjacent segment by a joint which allows pivoting of the segments in relation to each other, are intended to be included within the scope of the cable means of the present invention. Other structures performing functions equivalent to those performed by the described structures are to be considered within the scope of the cable means of the present invention.

Also represented in FIG. 14 is a combination lock generally designated at 105. Combination lock 105 is of the type generally available in the art and similar to the lock described earlier herein. The combination lock 105 and the structures associated therewith function as a preferred example of the locking means of the present invention. A water bottle holder, generally designated at 103, is also provided in a manner similar that found in the earlier described embodiment.

Referring next to the reverse perspective view of FIG. 15, one end cap 112 of the illustrated embodiment is represented. The end cap 112 is provided with an oval bore 110 through which the cables 102 and 104 pass. As described earlier, the oval bore 110 functions to guide the cables 102 and 104 to prevent their tangling, as they are withdrawn from, and retracted into, the tubular housing 100 and also to keep the cables in a substantially linear configuration as they exit the tubular housing 100. Positioning ridges 114 are also provided on the end cap 112. The positioning ridges 114 function to hold the tubular housing in position in clamps 122 (FIG. 14) as will be explained shortly.

Referring again to FIG. 14, the structures of the described embodiment which are used to pump air are represented in the cut away portion of the figure. A pump valve assembly is generally represented at 106. The pump valve assembly 106 functions to force air out of the tubular housing thorough a pump nozzle assembly, generally designated at 108, as the pump valve assembly 106 is moved in a reciprocating action within the tubular housing 100.

The pump valve assembly 106 is exemplary of the pump valve means of the present invention. While the illustrated pump valve assembly 106 is the presently preferred structure for the pump valve means of the present invention, other structures performing similar or equivalent functions can also serve as the pump valve means.

Figure 16:
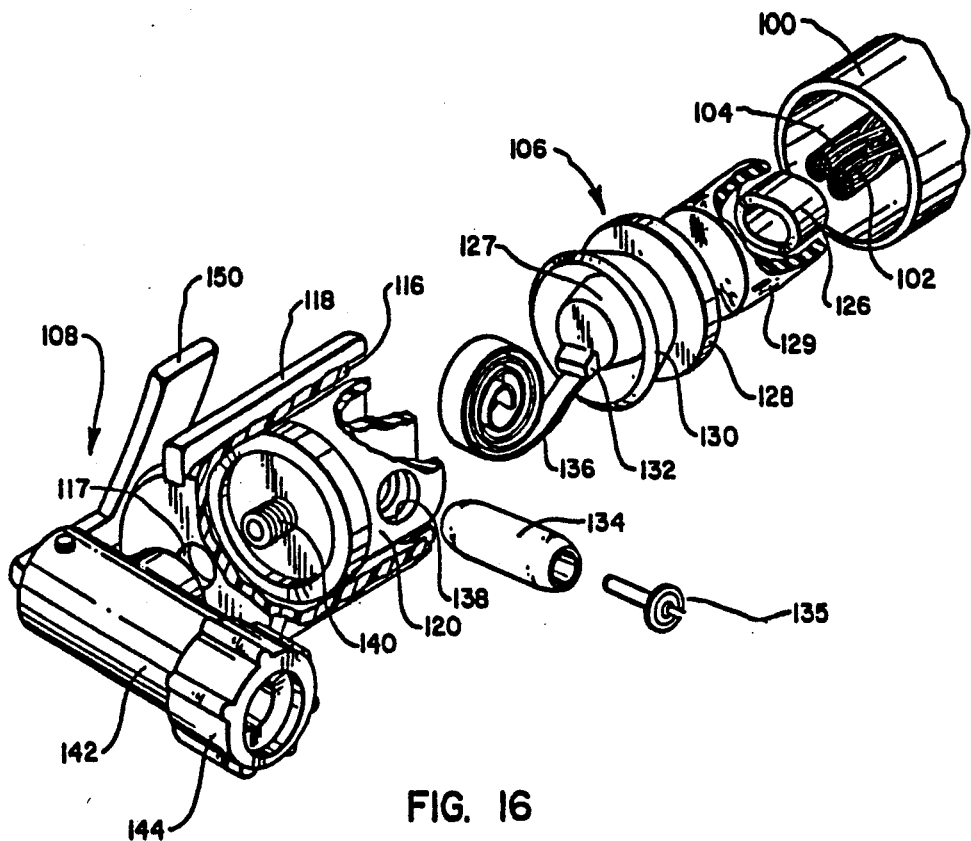
FIG. 16 is an exploded perspective view of a portion of the embodiment represented in FIG. 14.
Figure 17:
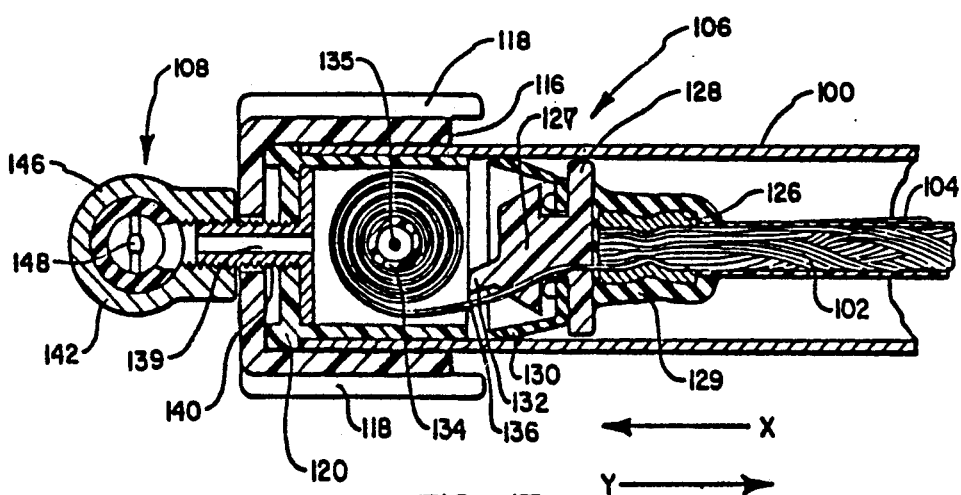
FIG. 17 is an elevated cross sectional view of a portion of the embodiment represented in FIG. 14 taken along line 17—17 of FIG. 14.

Reference will now be made to FIGS. 16 and 17, which provide exploded perspective and elevated cross sectional views, respectively, of the structures of the present invention which are particularly involved in the air pumping function of the present invention.

In FIGS. 16 and 17, the structure of the pump valve assembly 106 is shown in greater detail. The pump valve assembly 106 includes a pump valve body 128, an attachment plate 127 formed as part of the pump valve body 128, and a pump valve washer 130. The attachment plate 128 functions as a location where cables 102 and 104 may be adhered. Also, the attachment plate 128 can also function to keep the pump valve assembly 106 properly aligned within the tubular housing 100 as the pump valve assembly 106 moves therein.

As seen best in the cross sectional view of FIG. 17, the cables 102 and 104 are inserted into a crimp sleeve 126. The crimp sleeve 126 functions to hold the cables 102 and 104 in a side-by-side relationship within the tubular housing 100. The crimp sleeve 126 is also attached to the attachment plate 128 by a polycarbonate adhesive represented at 129 in FIG. 17. The adhesive is applied liberally and also serves to prevent air from escaping through the pump valve body 127.

The pump valve body 127 also holds in place the pump valve washer 130. The pump valve washer 130 is configured to perform the function of making a fluid (i.e., air) tight contact with the interior wall of the tubular housing 100. Thus, as the pump valve assembly 106 is forced in the direction indicated by arrow X, the fluid tight seal between the pump valve washer and the wall causes air to be forced out through the bore 139 provided in the threaded stud 140.

The illustrated configuration of the pump valve washer 130 is particularly suited for making a slidable sealing contact with the wall of the tubular housing 100. It will be understood, however, that other structures can perform the function of the illustrated pump valve washer 130.

The pump valve washer 130 is also particularly configured to allow air to pas between it and the inner wall of the tubular housing 100 when drawn in the direction indicated by arrow Y. Thus, as a user withdraws the cables 102 and 104 from the tubular housing 100, the interior of the tubular housing fills with air ready to be forced out through the threaded stud bore 239. Then, as the user pushes the cables 102 and 104 into the tubular housing 100, the air in front of the pump valve washer 130 is forced out through the threaded stud bore 139.

It will be appreciated that the cables 102 and 104, and their associated guiding structures, should be carefully chosen so that the cables will be "stiff" enough along their length so that the pump valve assembly 106 moves smoothly back and forth within the tubular housing 100.

Also represented in FIGS. 16 and 17 is a constant tension spring 136 which can be optionally provided in the embodiments of the invention. The constant tension spring 136 can be similar to the earlier described constant tension spring (32 in FIGS. 4 and 5) and should be chosen with attention being directed to considerations which are similar to those mentioned earlier.

The constant tension spring 136 is routed through a passage provided in the pump valve body 127 and secured to the cables 102 and 104 by the action of crimping sleeve 126. Importantly, the constant tension spring 136 must not interfere with, or contact, the pump valve washer 130. Also, the constant tension spring 136 must not be subjected to too much of a bend as it enters, and travels through, the passage provided in the pump valve body 127.

Desirably, the inclusion of the constant tension spring 136 imparts a smooth "feel" to the operation of the pump feature of the illustrated embodiment as well as ensuring that the cables 102 and 104 remain within the tubular housing 100 when not being used. The constant tension spring 136 is another example of the retraction means of the present invention.

The constant tension spring 136 is wound around, but not attached to, an axle 134. The axle 134 is received into a bore 138 provided in an insert member 120. As shown best in FIG. 17, when assembled, the constant tension spring 136 is disposed within the insert member 120 which is in turn fixed into one end of the tubular housing 100.

The pump valve body 127 is also provided with a bumper 132 which contacts the end of the insert member 120 and prevents the end of pump valve washer 130 from being damaged by contact with the end of the insert member 120. The axle is hollow so that a rivet 135 can be inserted through the axle 134 and the tubular housing 100 to hold the structures together.

In some cases, it is desirable to undersize the insert member 120 in relation to the inner diameter of the tubular housing 100 and to omit the rivet 135. This will allow the insert member 120 to rotate within the tubular housing 100. By allowing the insert member 120 to rotate, possible kinking of the constant tension spring 136 will be avoided.

For example, in the described embodiment, it is possible for a user to move the cables 102 and 104 so that constant tension spring 136 is rotated along its length. In order to accommodate this twisting motion, the insert member 120 can be allowed to rotate if desired. Those skilled in the art will be able to devise a means for accommodating the twisting of the constant tension spring and allowing the insert member 120 to rotate, with the inclusion of rivet 135. In general, allowing rotation in the range from about 20 degrees to about 60 degrees will accommodate any twisting of the constant tension spring 136.

With the insert member 120 in place, an end cap 116 is placed over the end of the tubular housing 100. As represented best in FIG. 17, the end cap 116 is provided with two positioning ridges 118 which aid in clamping the apparatus to the tube T (as shown in FIG. 14 representing, for example, a bicycle tube). It will be appreciated that those skilled in the art will be able to select any one of a number of techniques which will be suitable for fixing the end cap 118, and the other illustrated structures, together.

Still referring to FIG. 17, when end cap 116 is in place, the threaded stud 140 protrudes through an opening 117 provided in the end cap 116. A pump nozzle assembly 108 is threadably connected to the threaded stud 140. The pump nozzle assembly 108 is similar or identical to assemblies available in the art which are used to make an air tight connection between the pump and the valve stem of an inflatable article, for example, a bicycle tire inner tube.

As shown best in FIG. 16, the pump nozzle 108 comprises a body 142 having an air channel provided therethrough (not represented in the drawings) and a lock lever 150 which is used to engage and disengage any valve stem which is inserted therein. A removable ring 144 holds a gasket (146 in FIG. 17) in place. Preferably, the gasket 146 can be replaced to accommodate different configurations of valve stems. Shown in the cross sectional view of FIG. 17 is a valve depressor 148 as is known in the art.

It will be appreciated that many other structures which are, or will be, available in the art, can replace the illustrated pump nozzle assembly 108. The pump nozzle assembly 108 is a presently preferred example of the pump nozzle means of the present invention. Still, it will be appreciated that other structures performing equivalent functions can serve as the pump nozzle means of the present invention. For example, a hose provided with a connecter fitting on at least one of its ends is another example of the pump nozzle means of the present invention.

To use the pump feature of the embodiment illustrated in FIGS. 14–17, a valve stem from a bicycle tire inner tube, for example, is inserted into the body 142 of the pump nozzle assembly 108. As noted earlier, the pump nozzle assembly 108 can be adapted to receive different configurations of valve stems, for example, both presta and schrader valve stems as are available in the industry.

After the valve stem has been seated, and the lock lever 150 has been actuated, the user grasps the cables 102 and 104 and/or the combination lock 105 and withdraws the cables 102 and 104 from the tubular housing 100. The cables 102 and 104 are then pushed back into the tubular housing 100 causing air in front of the pump valve assembly (106 in FIG. 14) to be forced out of the tubular housing and into the inflatable article connected to the apparatus. The user continues the reciprocating movement with the cables 102 and 104 until the desired pressure within the inflatable article is reached at which time the valve stem is removed from the apparatus.

Figure 18:
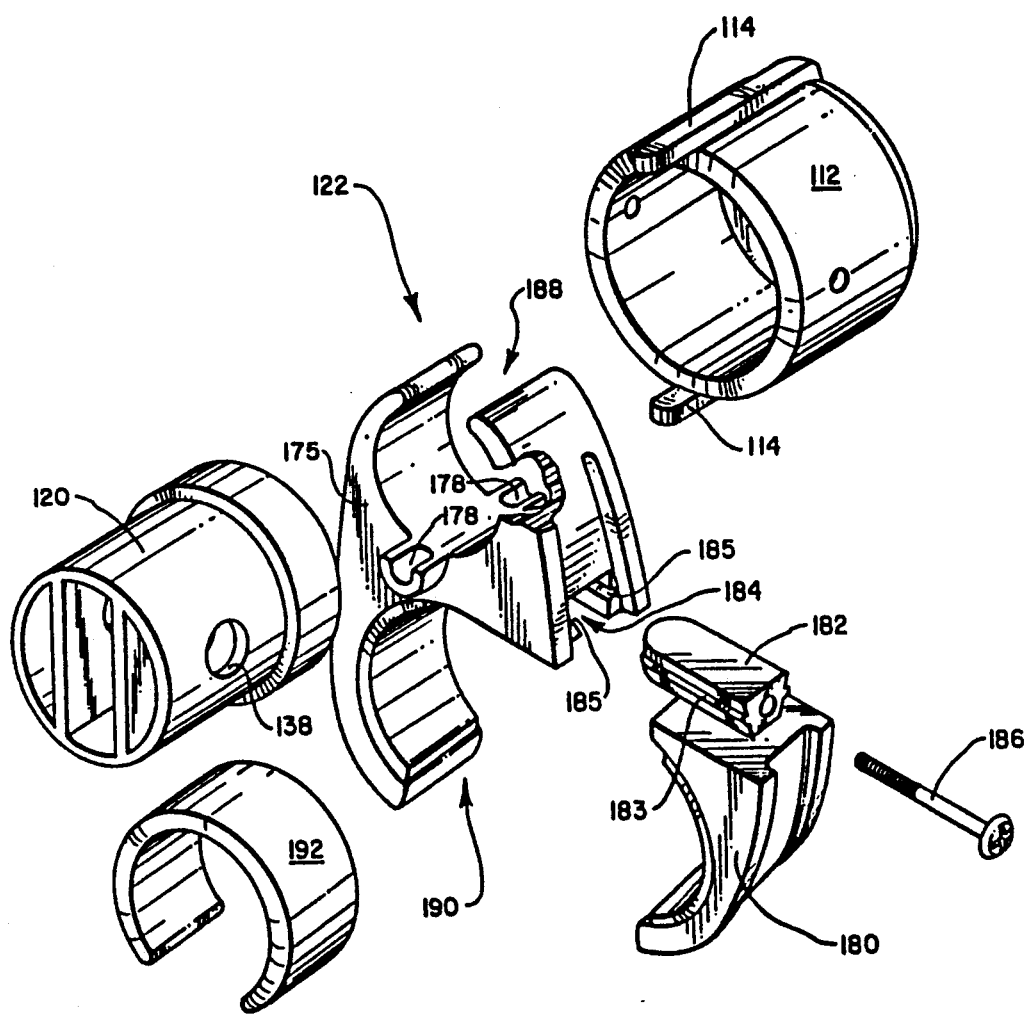
FIG. 18 is an exploded perspective view of another clamp constructed in accordance with the present invention.

Reference will now be made to the exploded perspective view of the clamp represented in FIG. 18. As explained earlier, the embodiments of the present invention have application in numerous settings. In particular, the present invention can be used on a variety of bicycles. In the industry, various bicycles may be encountered with a variety of differing diameters of tubing. Thus, it is important to provide a clamp structure which can readily accommodate the various sizes of tubing. The clamp 122 represented in FIG. 18 is able to accommodate a wide variety of tubing diameters.

The represented clamp 122 is provided with a body 176 which has a first jaw, generally designated at 188, and a second jaw, generally designated at 190. The tubular housing 100 is snapped into the first jaw 188. Two grooves 178 are provided on the clamp body 176. One of the grooves 178 receives one of the positioning ridges 114. When a positioning ridge 114 is received by a groove 178, the tubular housing (not shown in FIG. 18) is prevented from rotating within the first jaw 188. Two grooves 178 are preferably provided on each clamp body 176 and two positioning ridges are preferably provided on each end cap 112 so that each component can be mounted in either of two orientations.

The clamp 122 includes an adjustable clamp leg 180. The clamp leg 180 is provided with a key 182 which is received in a key way, generally designated at 184, provided on the clamp body 176. A bolt 186 extends through a bore in the key 182. The bolt 186 is received into a corresponding threaded bore (not represented in the figures) positioned at the end of the key way 184. The position of the adjustable leg 180 can be modified according to the diameter of tube to be clamped so the clamp will tightly grip the tube. In the case of a very small tube, a bushing 192 can be placed around the tube.

In view of the foregoing, it will be appreciated that the present invention is a great advance over the prior art devices used to secure wheeled articles, such as bicycles, to immobile objects to deter thefts thereof. The present invention includes an aesthetically attractive housing which is preferably as small as, or smaller than, a conventional bicycle frame tube. Moreover, the present invention allows the securing cables to be of sufficient size to deter the cutting or breakage thereof by a thief.

Moreover, the present invention provides a compact and efficient apparatus for both securing mobile articles to other objects and to inflate inflatable articles such as bicycle tires. The present invention also provides an apparatus which provides both air pumping and locking functions which is as compact as an apparatus which provides only one of these functions and which is light weight, compact, and particularly suited for providing both a lock and an air pump which can be carried on a bicycle.

Still further, the present invention may be easily attached to any one of a number of differing wheeled articles or may be incorporated into the frame member of the wheeled article. Still further, the present invention includes a retraction means which exerts a constant tension on the securing cables as they are retracted into, or withdrawn from, the housing. Even further, the present invention holds the securing cables so that undue rattles and noises potentially caused by vibration are not experienced. Yet further, the present invention provides a system for securing articles such as bicycles which is convenient and easy to use and which keeps the securing cables so that they remain out of the way when not being used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Pat. No. is:

1. A system for securing wheeled articles to immobile objects comprising:
   a tubular housing having a first end;
   a first length of cable having proximal and distal ends, the proximal end being at least partially disposed within the tubular housing and the distal end extending out of the first end of the tubular housing;
   a second length of cable having proximal and distal ends, the proximal end being at least partially disposed within the tubular housing and the distal end extending out of the first end of the tubular housing;
   first locking means for locking the distal end of the first cable to another object, the first locking means being positioned at the distal end of the first length of cable;
   second locking means for locking the distal end of the second cable to another object, the second locking means being positioned at the distal end of the second length of cable; and
   means for holding the first length of cable and the second length of cable in a substantially side-by-side relationship adjacent their proximal ends such that undue friction between the interior of the tubular housing and the first and second lengths of cable is avoided; and
   means for guiding the first and second lengths of cable as they are withdrawn from, and retracted into, the tubular housing such that the first and second lengths of cable are maintained in a substantially side-by-side relationship as they move through the first end of the tubular housing, the first and second lengths of cable being maintained in a subtantially side-by-side and linear configuration for a distance equal to at least ten percent of the length of the lengths of cable and such that the lengths of cable are not required to bend in a arc greater than ten degrees for a distance of ten percent of the length of the lengths of cable as the cable exits through the first end of the tubular housing such that the lengths of cable can be retracted into, and withdrawn from, the tubular housing without entanglement and without undue effort.

2. A system for securing wheeled articles to immobile objects as defined in claim 1 further comprising restriction means for restricting the removal of the proximal ends of the first and second lengths of cable from the tubular housing.

3. A system for securing wheeled articles to immobile objects as defined in claim 2 wherein the restriction means comprises an end cap positioned at the first end of the tubular housing, said end cap having an oval opening therein and the first and the second lengths of cable passing therethrough.

4. A system for securing wheeled articles to immobile objects as defined in claim 2 further comprising means for guiding the first and the second lengths of cable as they are withdrawn from, and retracted into, the housing.

5. A system for securing wheeled articles to immobile objects as defined in claim 1 wherein the first and the second lengths of cable are longer than the length of the housing.

6. A system for securing wheeled articles to immobile objects as defined in claim 1 wherein the first and the second lengths of cable are shorter than the length of the housing.

7. A system for securing wheeled articles to immobile objects as defined in claim 1 wherein a portion of the first and the second lengths of cable are maintained in a substantially linear configuration when within the housing.

8. A system for securing wheeled articles to immobile objects as defined in claim 7 wherein the wheeled article comprises a bicycle having a head tube and wherein the first and the second lengths of cable are disposed on opposite sides of the head tube when the bicycle is not secured to the immobile object.

9. A system for securing wheeled articles to immobile objects as defined in claim 1 wherein the first length of cable and the second length of cable are two discrete cable segments.

10. A system for securing wheeled articles to immobile objects as defined in claim 9 wherein the means for holding comprises a cable holding sleeve.

11. A system for securing wheeled articles to immobile objects as defined in claim 1 wherein the first length of cable and the second length of cable are portions of a continuous segment of cable.

12. A system for securing wheeled articles to immobile objects as defined in claim 11 wherein the means for holding comprises a cable holding sleeve.

13. A system for securing wheeled articles to immobile objects as defined in claim 1 wherein the housing comprises an elongated hollow tube.

14. A system for securing wheeled articles to immobile objects as defined in claim 13 wherein the housing comprises a substantially cylindrical housing having an outer diameter which is less than about 1.5 inches.

15. A system for securing wheeled articles to immobile objects as defined in claim 13 wherein the housing comprises a substantially cylindrical housing having an outer diameter which is less than about 1.0 inches.

16. A system for securing wheeled articles to immobile objects as defined in claim 13 wherein the housing comprises a substantially cylindrical housing having an outer diameter which is less than 0.75 inches.

17. A system for securing wheeled articles to immobile objects as defined in claim i wherein the housing has an inner cross-sectional dimension which is less than about 1.5 inches.

18. A system for securing wheeled articles to immobile objects as defined in claim 1 wherein the housing has an inner cross-sectional dimension which is less than about 1.0 inches.

19. A system for securing wheeled articles to immobile objects as defined in claim 18 wherein the first and second lengths of cable comprise steel cable having an uncoated diameter of at least one-eighth of an inch.

20. A system for securing wheeled articles to immobile objects as defined in claim 18 wherein the first and second lengths of cable comprise steel cable having an uncoated diameter of at least one-quarter of an inch.

21. A system for securing wheeled articles to immobile objects as defined in claim 18 wherein the first and second lengths of cable comprise steel cable having an uncoated diameter of at least three-eights of an inch.

22. A system for securing wheeled articles to immobile objects as defined in claim 1 wherein the housing has an inner cross-sectional dimension which is less than about 0.75 inches.

23. A system for securing wheeled articles to immobile objects as defined in claim 1 wherein the first length of cable and the second length of cable each comprise steel cable.

24. A system for securing wheeled articles to immobile objects as defined in claim 23 wherein the first length of cable and the second length of cable comprise a plastic coating.

25. A system for securing wheeled articles to immobile objects as defined in claim 23 wherein the steel cable comprises an uncoated diameter of at least one-eighth of an inch.

26. A system for securing wheeled articles to immobile objects as defined in claim 23 wherein the steel cable comprises an uncoated diameter of at least one-quarter of an inch.

27. A system for securing wheeled articles to immobile objects as defined in claim 23 wherein the steel cable comprises an uncoated diameter of at least three-eighths of an inch.

28. A system for securing wheeled articles to immobile objects as defined in claim 1 further comprising means for retracting the first length of cable and the second length of cable into the tubular housing.

29. A system for securing wheeled articles to immobile objects as defined in claim 28 wherein the means for retracting comprises a constant tension spring, a first end of the constant tension spring being connected to the means for holding.

30. A system for securing wheeled articles to immobile objects as defined in claim 1 further comprising means for attaching the tubular housing to a wheeled article.

31. A system for securing wheeled articles to immobile objects as defined in claim 30 wherein the article comprises a bicycle having a frame member, the bicycle frame member comprising the down tube of the bicycle frame.

32. A system for securing wheeled articles to immobile objects as defined in claim 1 wherein the tubular housing comprises a bicycle frame member.

33. A system for securing wheeled articles to immobile objects as defined in claim 1 wherein the tubular housing comprises an article frame member.

34. A system for securing wheeled articles to immobile objects as defined in claim 1 wherein the first locking means comprises a first loop formed at the distal end of the first length of cable and wherein the second locking means comprises a second loop formed at the distal end of the second length of cable.

35. A system for securing wheeled articles to immobile objects as defined in claim 1 wherein the first locking means comprises a first locking device attached to the distal end of the first length of cable and wherein the second locking means comprises a second locking device attached to the distal end of the second length of cable.

36. A system for securing wheeled articles to immobile objects as defined in claim 1 wherein the first and the second lengths of cable are of substantially the same length.

37. A system for securing wheeled articles to immobile objects as defined in claim 36 wherein the first length of cable is in the range from about 16 inches to about 24 inches in length.

38. A system for securing wheeled articles to immobile objects as defined in claim 1 further comprising a bottle holder fixed to an outer wall of the tubular housing.

39. A system for securing a bicycle to an immobile object to prevent unauthorized taking thereof, the system comprising:

a bicycle comprising a seat, a seat tube frame member holding a seat post connected to the seat, a down tube frame member, and a head tube frame member;

an elongated tubular housing having a cross-sectional dimension in the range of about 0.5 inches to about 2 inches, the housing being oriented in a substantially nonparallel orientation to the seat tube frame member;

a first length of cable having proximal and distal ends, the proximal end being positioned within the elongated tubular housing, the first length of cable being of large enough diameter and having sufficient rigidity such that the first length of cable resists cutting or breaking and is also resistant to bending around relatively small diameters;

a second length of cable having proximal and distal ends, the proximal end being positioned within the elongated tubular housing, second length of cable being of large enough diameter and having sufficient rigidity such that the second length of cable resists cutting or breaking and is also resistant to bending around relatively small diameters;

means for holding the first length of cable and the second length of cable in a substantially parallel relationship adjacent their proximal ends such that undue friction between the interior of the elongated hollow housing and the first and second lengths of cable is avoided and the first and second lengths of cable may be withdrawn from, and retracted into, the tubular housing;

first locking means for locking the distal end of the first cable to the distal end of the second length of cable, the first locking means being positioned at the distal end of the first length of cable;

second locking means for locking the distal end of the second cable to the distal end of the first length of cable, the second locking means being positioned at the distal end of the second length of cable;

means for restricting the removal of the proximal ends of the first and second lengths of cable from the tubular housing;

means for holding the first and the second lengths of cable in a substantially parallel relationship as the first and second lengths of cable pass through the first end of the tubular housing;

means for retracting the first length of cable and the second length of cable into the tubular housing, the means for retracting comprising a constant tension spring;

means for attaching the tubular housing to the bicycle such that the first and the second lengths of cable may be withdrawn from the tubular housing when the cables are to be locked around an immobile object and the first and second lengths of cable may be retracted into the tubular housing when not in use; and means for guiding the first and the second lengths of cable as they are withdrawn from, and retracted into, the housing such that the first length of cable and the second length of cable are maintained in a substantially side-by-side relationship as they move into and out of the housing, the first length of cable and the second length of cable being maintained in a substantially linear configuration for a substantial portion of their lengths as they exit from the housing such that the first and second lengths of cable are not substantially bent for a significant portion of their length after exiting the housing such that the first length of cable and the second length of cable can be retracted into, and withdrawn from, the housing without entanglement, without binding on the guiding means or the interior of the housing and without undue effort on the part of a user.

40. An apparatus for inflating articles and for securing mobile articles to other objects, the apparatus comprising:

housing means for providing an enclosure, the housing means having a first end and a second end;

cable means, the cable means having proximal and distal ends, the proximal end being at least partially disposed within the housing means and the distal end capable of extending out of the first end of the housing means;

locking means for fastening the cable means around or to another object;

pump nozzle means for making a substantially fluid-tight connection between the interior of the housing means and the inflatable article, the pump nozzle means attached to the housing means; and pump valve means for forcing the air contained in the housing means through the pump nozzle means, the pump valve means being disposed within the housing means and being connected to the cable means such that as the cable means is linearly moved within the housing means air is forced through the pump nozzle means.

41. An apparatus for inflating articles and for securing mobile articles to other objects as defined in claim 40 wherein the cable means comprises:

first cable means, the first cable means having proximal and distal ends, the proximal end being at least partially disposed within the housing means and the distal end extending out of the first end of the housing means;

second cable means, the second cable means having proximal and distal ends, the proximal end being at least partially disposed within the housing means and the distal end extending out of the first end of the housing means.

42. An apparatus for inflating articles and for securing mobile articles to other objects as defined in claim 41 wherein the housing means comprises a tubular housing and further comprising means for holding the first cable means and the second cable means in a substantially side-by-side relationship adjacent their proximal ends such that undue friction between the interior of the tubular housing and the first and the second cable means is avoided as the first and second cable means is withdrawn from, and retracted into, the tubular housing.

43. An apparatus for inflating articles and for securing mobile articles to other objects as defined in claim 42 wherein the first cable means comprises a first length of cable and wherein the second cable means comprises a second length of cable.

44. An apparatus for inflating articles and for securing mobile articles to other objects as defined in claim 40 wherein the pump nozzle means comprises:

a body having an air channel therethrough; and
a gasket adapted for making an air tight connection to a valve stem.

45. An apparatus for inflating articles and for securing mobile articles to other objects as defined in claim 40 wherein the pump valve means comprises:

a body;
a pump valve washer, the pump valve washer being configured to form an air tight seal against the inner wall of the tubular housing when moved in a first direction and allow air to pass between the pump valve washer and the inner wall of the tubular housing when moved in a second direction; and
an attachment plate formed on the body.

46. An apparatus for inflating articles and for securing mobile articles to other objects as defined in claim 40 further comprising retraction means for exerting tension on the cable means to bias the cable means into the tubular housing.

47. An apparatus for inflating articles and for securing mobile articles to other objects as defined in claim 46 wherein the retraction means comprises a spring and wherein the apparatus further comprising means for accommodating the twisting of the spring.

48. An apparatus for manually inflating bicycle tires and the like as well as for securing bicycles and other wheeled articles to other objects to prevent the theft thereof, the apparatus comprising:

housing means for providing an enclosure, the housing means having a first and a second end;

first cable means, the first cable means having proximal and distal ends, the proximal end being at least partially disposed within the housing means and the distal end extending out of the first end of the housing means;

second cable means, the second cable means having proximal and distal ends, the proximal end being at least partially disposed within the housing means and the distal end extending out of the first end of the housing means;

locking means for fastening the first cable means to the second cable means such that a loop around an object can be formed;

cable holding means for holding the first cable means and the second cable means in a substantially side-by-side relationship adjacent their proximal ends such that undue friction between the interior of the housing means and the first and the second cable means is avoided as the first and second cable means are withdrawn from, and retracted into, the housing means;

pump nozzle means for making an air connection to a pneumatic tire of a bicycle or the like, the pump nozzle means located on the housing means; and pump valve means for forcing the air contained in the housing means through the pump nozzle means, the pump valve means being disposed within the tubular housing and being connected to the first and the second cable means such that as the first and the second cable means are repeatedly withdrawn from, and retracted into, the tubular housing, the pump valve means travels within the tubular housing forcing air through the pump nozzle means to inflate an inflatable article connected to the pump nozzle means and such that the first and the second cable means are also capable of being withdrawn from the housing means and secured to another object.

49. An apparatus for manually inflating bicycle tires and the like as well as for securing bicycles and other wheeled articles to other objects to prevent the theft thereof as defined in claim 48 further comprising restriction means for restricting the removal of the proximal end of the cable means from the housing means.

50. An apparatus for manually inflating bicycle tires and the like as well as for securing bicycles and other wheeled articles to other objects to prevent the theft thereof as defined in claim 48 further comprising means for guiding the cable means as it is withdrawn from, and retracted into, the housing means.

51. An apparatus for manually inflating bicycle tires and the like as well as for securing bicycles and other wheeled articles to other objects to prevent the theft thereof as defined in claim 48 wherein the cable means comprises first and second lengths of cable and wherein a portion of the first and the second lengths of cable are maintained in a substantially linear configuration when within the housing means.

52. An apparatus for manually inflating bicycle tires and the like as well as for securing bicycles and other wheeled articles to other objects to prevent the theft thereof as defined in claim 48 wherein the cable means comprise a first length of cable and a second length of cable, the first and second lengths of cable being two discrete cable segments.

53. An apparatus for manually inflating bicycle tires and the like as well as for securing bicycles and other wheeled articles to other objects to prevent the theft thereof as defined in claim 52 further comprising a cable holding sleeve positioned on the first and second lengths of cable configured to hold the first and second lengths of cable in a substantially linear configuration.

54. An apparatus for manually inflating bicycle tires and the like as well as for securing bicycles and other wheeled articles to other objects to prevent the theft thereof as defined in claim 48 wherein the cable means comprises a first length of cable and a second length of cable, the first length of cable and the second length of cable being portions of a continuous segment of cable.

55. An apparatus for manually inflating bicycle tires and the like as well as for securing bicycles and other wheeled articles to other objects to prevent the theft thereof as defined in claim 52 further comprising a cable holding sleeve positioned on the first and second lengths of cable configured to hold the first and second lengths of cable in a substantially linear configuration.

56. An apparatus for manually inflating bicycle tires and the like as well as for securing bicycles and other wheeled articles to other objects to prevent the theft thereof as defined in claim 54 as defined in claim 48 wherein the housing means comprises an elongated tubular housing.

57. An apparatus for manually inflating bicycle tires and the like as well as for securing bicycles and other wheeled articles to other objects to prevent the theft thereof as defined in claim 48 wherein the cable means comprises steel cable having an uncoated diameter of at least one-quarter of an inch.

58. An apparatus for manually inflating bicycle tires and the like as well as for securing bicycles and other wheeled articles to other objects to prevent the theft thereof as defined in claim 48 wherein the cable means comprises steel cable having an uncoated diameter of at least three-eights of an inch.

59. An apparatus for manually inflating bicycle tires and the like as well as for securing bicycles and other wheeled articles to other objects to prevent the theft thereof as defined in claim 48 further comprising means for retracting the cable means into the housing means.

* * * * *